(12) United States Patent
Blanchard

(10) Patent No.: US 8,000,377 B2
(45) Date of Patent: Aug. 16, 2011

(54) SYSTEM AND METHOD FOR VARIABLE RATE MULTIPLE ACCESS SHORT MESSAGE COMMUNICATIONS

(75) Inventor: Scott D. Blanchard, Mesa, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 1754 days.

(21) Appl. No.: 10/853,481

(22) Filed: May 24, 2004

(65) Prior Publication Data

US 2005/0259723 A1    Nov. 24, 2005

(51) Int. Cl.
*H04B 1/00* (2006.01)

(52) U.S. Cl. ........ 375/146; 375/133; 375/135; 375/140; 375/141; 375/295; 375/299

(58) Field of Classification Search ................... 375/146, 375/206, 201, 133, 135, 140, 141, 295, 299; 370/320, 342, 411; 455/450
See application file for complete search history.

(56) References Cited

U.S. PATENT DOCUMENTS

| | | | |
|---|---|---|---|
| RE35,402 E * | 12/1996 | Schilling | 375/143 |
| 5,608,722 A * | 3/1997 | Miller | 370/320 |
| 5,629,929 A | 5/1997 | Blanchard et al. | |
| 5,751,761 A * | 5/1998 | Gilhousen | 375/146 |
| 5,764,690 A | 6/1998 | Blanchard et al. | |
| 5,862,132 A | 1/1999 | Blanchard et al. | |
| 5,903,550 A * | 5/1999 | Spock | 370/335 |
| 6,434,131 B1 * | 8/2002 | Sari | 370/335 |
| 6,563,807 B1 * | 5/2003 | Kim et al. | 370/331 |
| 7,072,324 B1 * | 7/2006 | Kim et al. | 370/342 |
| 2003/0120994 A1 * | 6/2003 | Dent | 714/786 |
| 2004/0043784 A1 * | 3/2004 | Czaja et al. | 455/522 |
| 2004/0114552 A1 * | 6/2004 | Lim et al. | 370/324 |

* cited by examiner

*Primary Examiner* — Kabir A Timory

(74) *Attorney, Agent, or Firm* — Ingrassia Fisher & Lorenz, P.C.

(57) ABSTRACT

A communication system and receiver is provided that facilitates increased message size in a communication system that supports a large number of transmitters sharing a common frequency band. The communication system facilitates increased message size by incorporating a plurality of transmit bit sets in each burst of data. The additional transmit bit sets are incorporated into a plurality of transmit codes that are generated using at least one additional spreading code that is orthogonal to the base spreading code. The plurality of transmit codes are then combined into one composite message and the composite message is spread again using another scrambling sequence. The final composite spread message is transmitted to the receiver in the appropriate message time slot, resulting in CDM/TDMA burst signal that facilitates increased message size.

46 Claims, 9 Drawing Sheets

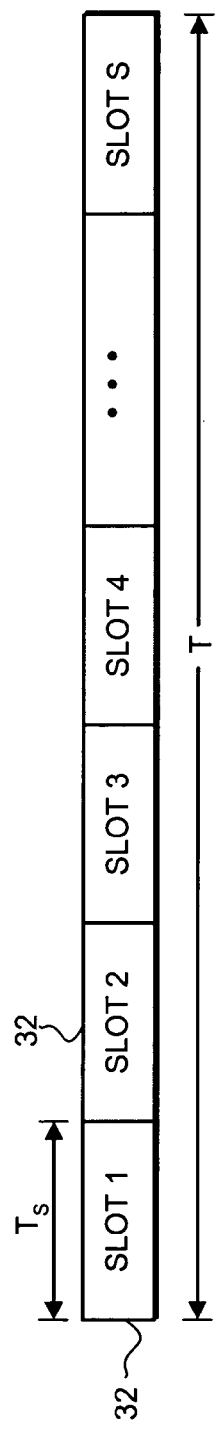

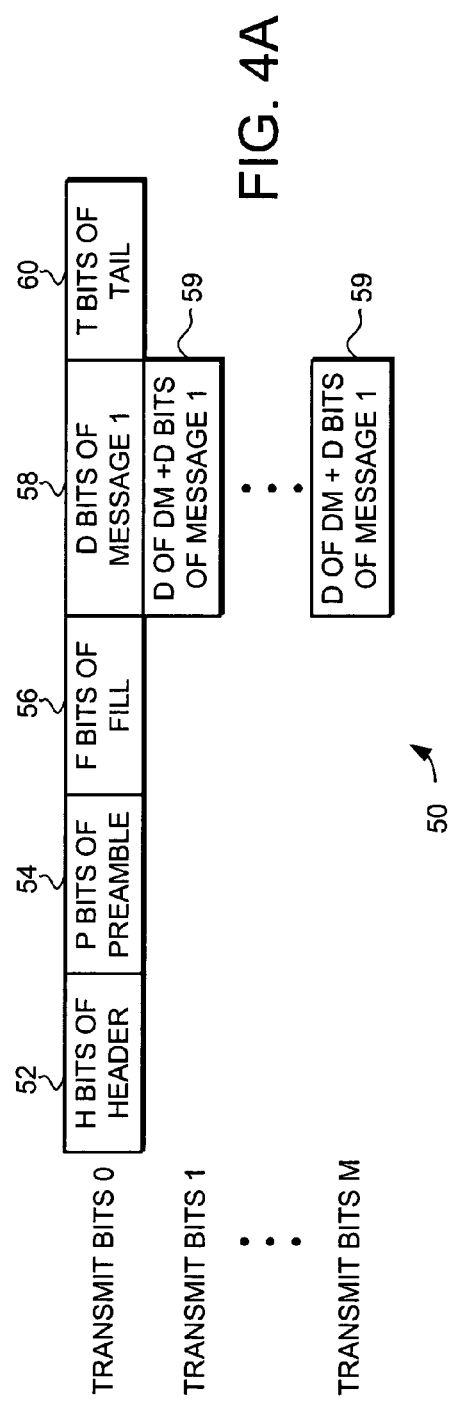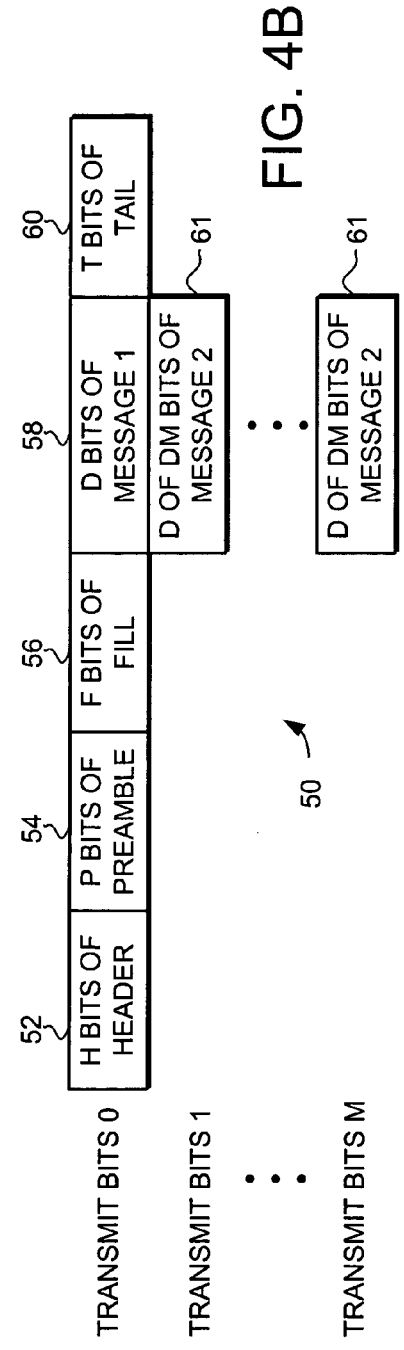

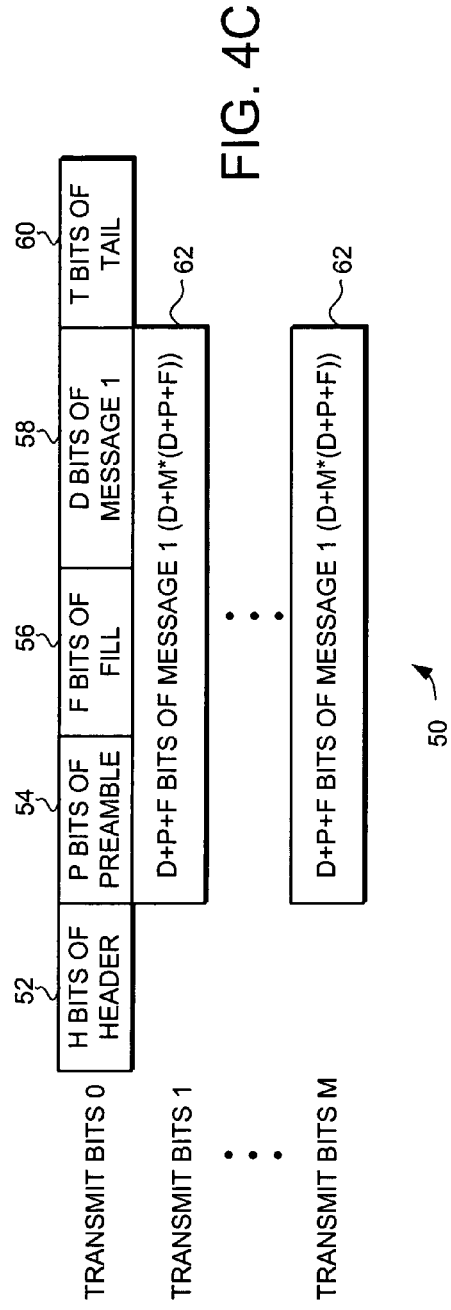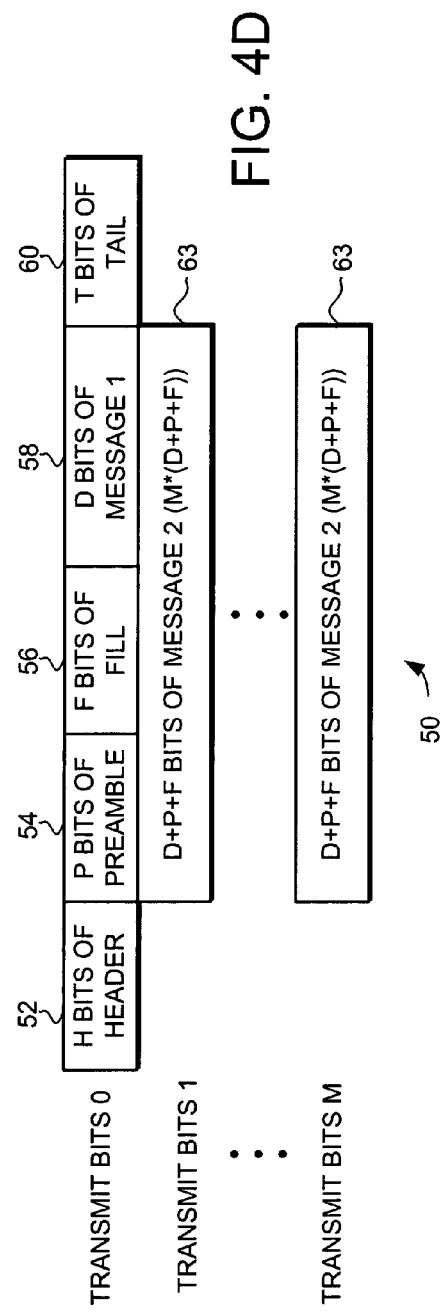

SYSTEM AND METHOD FOR VARIABLE RATE MULTIPLE ACCESS SHORT MESSAGE COMMUNICATIONS

TECHNICAL FIELD

The present invention generally relates to communication systems, and more particularly relates to systems and methods for multiple access short message communications.

BACKGROUND

This invention relates to a multiple access communication systems and, in particular, to a communications system utilizing frequency division, code division and time division multiple access techniques for providing efficient use of frequency spectrum while supporting a large number of transmitters sharing a common frequency band by having all transmitters synchronized to a common timing reference.

Frequency division multiple access (FDMA) systems involve assigning each user a specific frequency for its respective transmission. Accordingly, a high number of users within an FDMA system requires a large frequency band. For example, if ten users are desired within an FDMA system, ten separate and independent frequencies would be required.

Time division multiple access (TDMA) systems involve multiple users sharing a common frequency but each user transmits at a specific time and only for a predetermined time period. Accordingly, each TDMA user does not transmit continuously but only in its specific time slot. Therefore, for ten users within a TDMA system, each one would transmit only one-tenth of the total transmission time. Furthermore, since each user within a TDMA system is transmitting only a portion of the time, each user will be required to transmit at high rates over a shorter time interval as the number of users increase. TDMA systems also require some form of synchronization between the transmitter and its respective receiver.

Code division multiple access (CDMA) systems involve each user transmitting at the same time and at the same frequency. Further, CDMA systems perform spread spectrum techniques by multiplying the transmit sequence by a pseudorandom pattern of ones and zeros of which the receiver to receive the transmitted sequence knows. However, while CDMA systems have a "soft-capacity" in that additional users may be added with only slight system degradation, such systems are not efficient when transmitting only short bursts of data at low duty cycles.

Other systems have used CDMA and TDMA techniques to transmit bursts of data while efficiently using the frequency spectrum and supporting a large number of transmitters/users. In these systems, many users of the communications system share a common frequency band, but each transmit their respective message bursts of data at different and specific times via a TDMA technique, as defined by the system.

Unfortunately, these systems require synchronization between transmitters and receivers requiring a full duplex radio link and have been limited in the message size that can be sent to each user. For example, some systems have been limited to a message size of 120 bits. This message size is too short for some applications.

Hence, there exists a need for an improved communications system that provides efficient use of frequency spectrum while supporting a large number of transmitters sharing a common frequency band and simplex operation and supports larger message sizes, while not requiring synchronization between transmitters and receivers.

BRIEF SUMMARY

The present invention provides a communication system and receiver that facilitates increased message size in a communication system that supports a large number of transmitters sharing a common frequency band. The communication system facilitates increased message size by incorporating a plurality of transmit bit sets in each burst of data. The additional transmit bit sets are incorporated into a plurality of transmit codes that are generated using at least one additional spreading code that is orthogonal to the base spreading code. The plurality of transmit codes are then combined into one composite message and the composite message is spread again using another scrambling sequence. The final composite spread message is transmitted to the receiver in the appropriate message time slot.

The communication system is thus implemented using code division multiplexing (CDM) and time division multiple access (TDMA) techniques for transmitting bursts of data while efficiently using the frequency spectrum and supporting a large number of transmitters/users. Specifically, many users of the communications system share a common frequency band, but each transmit their respective message bursts of data at different and specific times via a TDMA technique, as defined by the system. The communication system facilitates increased message size by using CDM techniques that use a plurality of additional spreading codes that are orthogonal to the base spreading code. The CDM techniques facilitate the transmission of multiple transmit bit sets in each TDMA burst of data. To facilitate synchronization of the CDM/TDMA technique, each transmitter of the system is synchronized to a common timing reference thereby abating the need to maintain synchronization between the transmitters and receivers of the system and the need for a full duplex radio link.

BRIEF DESCRIPTION OF THE DRAWINGS

The present invention will hereinafter be described in conjunction with the following drawing figures, wherein like numerals denote like elements.

FIG. 2 is a pictorial diagram illustrating the TDMA frame structure of the communication system of FIG. 1;

FIG. 3 is a pictorial diagram illustrating a superframe including m frames similar to the TDMA frame of FIG. 2;

FIGS. 4A, 4B, 4C and 4D are pictorial diagrams illustrating the structure of a TDMA burst within each defined time slot of a superframe of FIG. 3;

DETAILED DESCRIPTION

Figure 1:
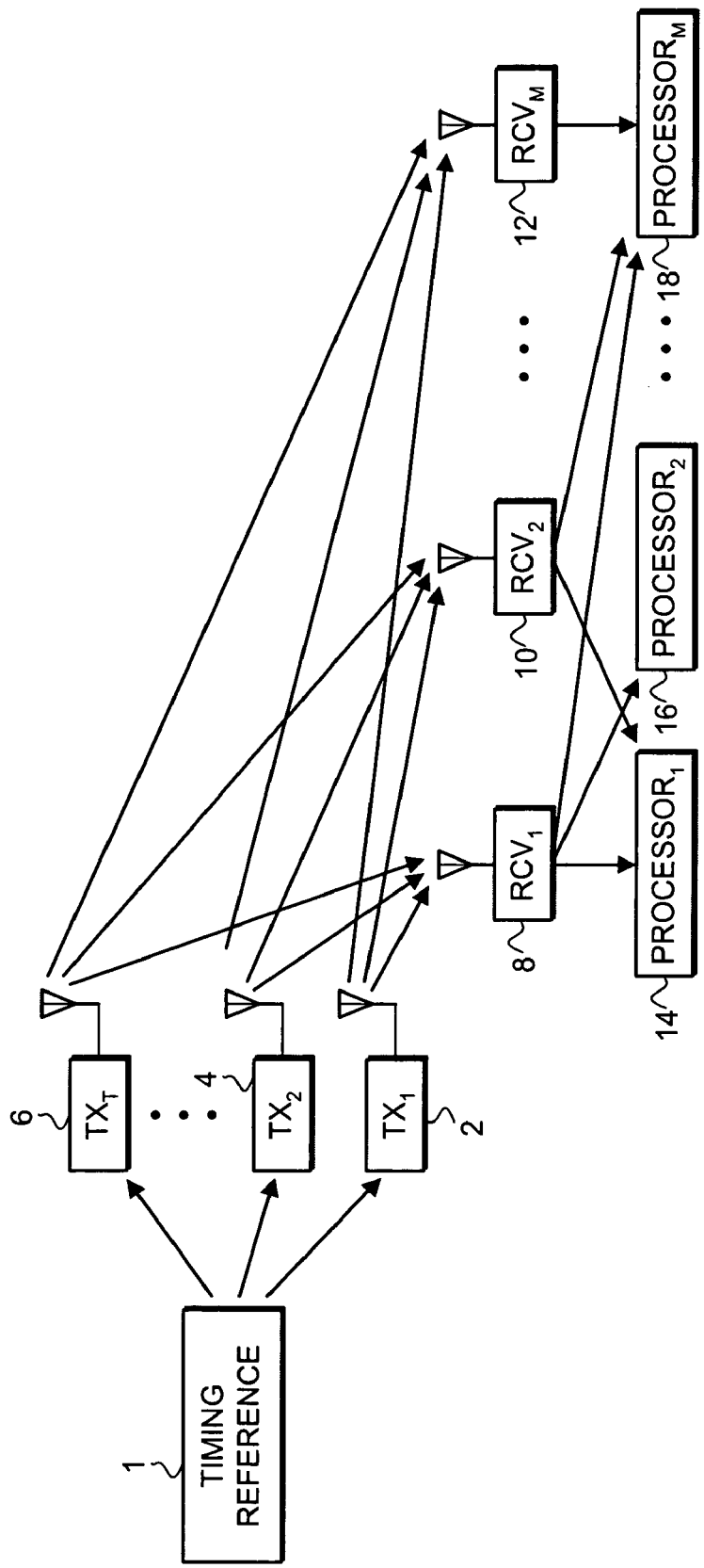
FIG. 1 is a block diagram illustrating a communication system in accordance with an exemplary embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The present invention provides a communication system and receiver that facilitates increased message size in a communication system that supports a large number of transmitters sharing a common frequency band. The communication system facilitates increased message size by using code division multiplexing (CDM) to incorporate a plurality of transmit bit sets in each burst of data. The additional transmit bit sets are incorporated into a plurality of transmit codes that are generated using at least one additional spreading code this is orthogonal to the base spreading code. The use of additional spreading codes facilitates the simultaneous transmission of additional message bits to a receiver and thus provide for increased message size.

Specifically, the message data is first encoded and interleaved into multiple transmit bit sets, with each set including a portion of the overall message data. The message data in the multiple transmit bit sets are then code division multiplexed into multiple transmit codes using multiple orthogonal spreading codes. The multiple transmit codes are combined into one composite message and the composite message is spread again using another scrambling sequence. The final composite spread message is transmitted to the receiver in the appropriate message time slot. The receiver can then despread and demodulate the multiple transmit codes and extract the message from the transmission. Using the multiple transmit codes in this manner can significantly increase the number of bits that can be sent in each message. For example, in some implementations it can result in an 8 to 10× increase in message length, and in other implementations with an increase in transmitted power it can result in a 50 to 100× increase in message length.

The message data can be encoded and interleaved into multiple transmit bit sets and spread across multiple transmit codes using a variety of different techniques. In some embodiments the base transmit code is used to carry a separate message, and in other embodiments the base transmit code is combined with the other transmit codes to carry one larger message. In other embodiments, the additional message data is transmitted in parallel, but not overlapping the preamble bits of the base transmit bit set. In another embodiment, the additional message data overlaps the preamble bits in the base transmit bit set to facilitate additional message length.

The communication system is implemented code division multiplexing (CDM) and time division multiple access (TDMA) techniques for transmitting bursts of data while efficiently using the frequency spectrum and supporting a large number of transmitters/users. Furthermore, additional transmitters and receivers can be providing using frequency division multiple access (FDMA) and code division multiple access (CDMA) to facilitate multiple transmissions in each TDMA time slot. Specifically, many users of the communications system can share a common frequency band, but each transmits their respective message bursts of data at different and specific times via a TDMA technique, as defined by the system. To facilitate synchronization of the TDMA technique, each transmitter of the system is synchronized to a common timing reference thereby abating the need to maintain synchronization between the transmitters and receivers of the system.

The TDMA technique of the present invention utilizes a TDMA superframe structure that is comprised of a plurality of TDMA frames whereby each TDMA frame includes a predetermined number of specific time slots for transmitting each burst of data. In this manner, different users can be transmitting at different rates because some users may be transmitting once per frame, some users at once every two frames, and even some users may transmit at as little as once every superframe.

Each TDMA burst of data can include one or more messages spread across multiple transmit codes using multiple orthogonal spreading codes. The spread multiple transmit codes are combined into one composite message and the composite message is spread again using another scrambling sequence by multiplying the burst of data to be transmitted by a pseudo-random sequence of ones and zeroes and transmitting such spread spectrum burst of data for reception by one or more receivers within the system.

Referring to FIG. 1, a block diagram illustrating a communications system in accordance with the present invention is shown. The system includes T transmitters as denoted by reference numbers 2-6 for transmitting bursts of data. Each of the T transmitters receives a signal from timing reference 1 for supplying each of the transmitters with a precise time reference having time knowledge such as time of day, master frame counter, or super frame counter, and a precise timing signal such as a 1 pulse per second (PPS) signal from a GPS system, or a similar type signal from a LORAN system, or a frame strobe.

Such timing reference 1 allows each of the transmitters to transmit bursts of data at precise times and for precise time intervals. To that end, each one of the transmitters 2-6 are assigned the following TDMA information by the communications system for specifying a transmit opportunity for each transmitter: (i) a time slot in which they are allowed to transmit, (ii) a position within the framing structure, (iii) an interval between successive transmissions, (iv) a spreading code to be used for transmission, and (v) a frequency for transmission. The frequency assigned to each transmitter may be an absolute single frequency or it could be a alternated between a plurality of frequencies or a sequence of frequencies to transmit at as in a hopping sequence.

Each of the T transmitters 2-6 transmit their information (bursts of data) to M receivers as denoted by reference numbers 8-12. It is important to note that each receiver does not have to receive the transmitted signal from all transmitters. Additionally, a single receiver may receive the transmission from one, two or more transmitters. Further, no synchronization between the transmitters and receivers is needed because the transmitters are all synchronized to a common timing reference 1, as described above.

The communication system also includes L processors as denoted by reference numbers 14-18 which are coupled to the M receivers 8-12 whereby not all processors need not be coupled to all receivers.

As an application of the above described communications system, transmitters 2-6 may be provided and affixed to trucks of a specific company whereby the receivers would be located to provide adequate coverage in the desired area where the trucks may roam. For example, the receivers may be strategically positioned throughout a city for tracking the trucks through the specific city or they may be located on satellites for tracking the position of trucks nationwide or worldwide. In such an application, the transmitters 2-6 would transmit to the receivers information identifying its specific location as well as other information, warning messages, or the like. The receivers 8-12 will receive such transmitted messages and processors 14-18 may be used to determine what information has been transmitted. Further, in this example, the multiple processors may be status displays at various warehouses or different trucking companies' headquarters.

Referring to FIG. 2, a pictorial diagram illustrating the TDMA frame structure of the communications system of FIG. 1 is shown. TDMA frame 30 includes a plurality of slots as denoted by slot 1 through slot S and identified by reference number 32. In a preferred embodiment, the time interval for each slot (T.sub.s) is 100 milliseconds and S is 600. Accordingly, the time associated with one TDMA frame 30 (T.sub.frame) is 60 seconds. In determining the time for each slot (T.sub.s), consideration is given to the amount of information desired to be transmitted per slot. Further, in determining frame time (T.sub.frame), consideration is given to the minimum time interval between transmissions of users.

TDMA bursts of data can be transmitted in each slot in the TDMA frame 30, and each TDMA burst of data can include one or more messages spread across multiple transmit codes using multiple orthogonal spreading codes. The final composite spread message is transmitted to the receiver in the appropriate message time slot in the TDMA frame 30. The receiver can then demodulate the multiple transmit codes and extract the message from the transmission.

Referring now to FIG. 3, superframe 40 is illustrated which includes M frames similar to TDMA frame 30 of FIG. 2. As shown, superframe 40 includes M frames and each having S times slots. Accordingly, a total of M times S time slots are available for transmission per superframe. Referring back to the above example, for a time slot of 100 milliseconds and S=600, if M=10, then each superframe 40 has a duration of 10 minutes and provides a total of 6,000 time slots whereby the number of frames M in a superframe is determined by considering the maximum time interval between transmissions.

Within each superframe, many users may be transmitting via the plurality of M times S time slots with one user transmitting one or more messages per each time slot. Moreover, each of the users may be transmitting at different rates from the other users. For example, one user may transmit once per frame (i.e., M times per superframe) while other users may transmit once every two frames (i.e., M/2 times per superframe). Further, some users may just transmit once per superframe. Accordingly, as mentioned above, each user is assigned a slot number, a frame position number and an interval number. In particular, the time slot number defines which slot within a frame the user will transmit, the frame position number defines the first frame in which the user will transmit, and the interval number defines the number of frames between transmissions. As an example, if user A was assigned a slot number of 1, a frame position number of 1, and an interval number of 1, user a would transmit in the time slots denoted with the letter A in superframe 40 and, thus, would transmit M times per superframe. Likewise, if a user B was assigned the slot number of 2, a frame number of 1, and an interval number of 2, user B would transmit in the time slots as denoted with the letter B in superframe 40 and, thus, would transmit M/2 times per superframe. Similarly, if a user C was assigned a slot number of 4, a frame position number of 4, and an interval number of M (where m is the total number of frames per superframe), then user C would transmit in the time slot as labeled C in superframe 40 and would transmit only once per superframe. Accordingly, some users are transmitting every sixty seconds (per frame), some users may be transmitting every other frame (every two minutes), while some may be transmitting once every ten minutes (once per superframe). Accordingly, the communication system of the present invention has the capability of assigning different users more transmission bandwidth based upon their needs through the above-described superframe allocation.

Referring to FIGS. 4A, 4B, 4C and 4D, several different embodiments of a TDMA burst 50 are shown. Each TDMA burst 50 includes one or more messages encoded into a plurality of transmit bit sets, which are then spread into multiple transmit codes and transmitted within a defined time slot of superframe 40. Each TDMA burst 50 includes a base transmit bit set 0 and M transmit bit sets 1-M. Each base transmit bit set 0 in TDMA burst 50 includes h bits of header as identified by block 52 where h is selected based on the time it takes for the transmitter to settle and to reduce spectral splatter. In a preferred embodiment, three bits of header were chosen.

Each base transmit bit set 0 in the TDMA burst 50 also includes p bits of preamble as identified in block 54 whereby p is selected for the probability of reception of the message and, in a preferred embodiment, p was chosen to be 32 bits.

Next, each base transmit bit set 0 in the TDMA burst 50 includes f bits of fill as denoted by block 56 whereby the f bits of fill are used to allow some time for the receiver between the p bits of preamble and the message bits to follow. The number of fill bits is selected considering the receiver processing time requirements and burst efficiency. In a preferred embodiment, f was chosen to be zero so as to maximize burst efficiency.

Each base transmit bit set 0 in the TDMA burst 50 also includes d bits of data message as denoted in block 58. In a preferred embodiment, 332 bits of message were used.

Next, each base transmit bit set 0 in the TDMA burst 50 includes t bits of tail as denoted by block 60 which are used to allow the time for the transmitter to turn off.

Each TDMA burst 50 is preferably shorter in duration than the time interval for each slot (Ts), whereby no transmission occurs for some time interval after the transmission of the TDMA burst and before the beginning of the next time slot. This time interval is selected considering the distance between transmitters and receivers to account for the time it takes for a transmitted message to reach a receiver, to the accuracy and jitter of the time reference between receivers, and to preventing overlap with other messages. In a preferred embodiment, this time interval was selected to be 20 milliseconds.

As stated above, each base transmit bit set 0 in the TDMA burst 50 also includes d bits of data message as denoted in block 58. To facilitate increased message length, additional bits data of message data are included in transmit bit sets 1-M. In some embodiments the base transmit bit set 0 and the other transmit bit sets 1-M are used to carry parts of the same message. In other embodiments the base transmit bit set 0 and the other transmit bit sets 1-M are designed to carry multiple messages. In a variation on both these embodiments, message data bits in transmit bit sets 1-M are limited to be concurrent with the data bits in the base message. In another variation on both these embodiments, message data bits in transmit bit sets 1-M are concurrent with the data bits, fill bits and/or preamble bits of the base message to facilitate even greater message length.

In all these embodiments, the plurality of transmit bit sets 0-M are incorporated into a plurality of transmit codes that are generated using at least one additional spreading code that is orthogonal to the base spreading code. The plurality of transmit codes are then combined into one composite message and the composite message is spread again using another scrambling sequence. The final composite spread message is transmitted to the receiver in the appropriate message time slot.

In first embodiment illustrated in FIG. 4A, each transmit bit set 1-M includes d bits of data as identified by blocks 59 transmitted concurrently with the d bits of data transmitted in the base transmit bit set 0. Additionally, in the embodiment illustrated in FIG. 4A the data bits transmitted in the base transmit bit set 0 and the transmit bit sets 1-M are all part of message 1. Thus, the embodiment of FIG. 4A is able to transmit one message with a total of $[(d+1)*M]$ data bits. This is a significant increase over prior systems that would have been limited to the d bits of the base message. In some implementations, the transmission of bits on transmit bit sets 1-M can result in an 8 to 10× increase in message length, and with an increase in transmit power, can result in a 50 to 100× increase in message length.

In the second embodiment illustrated in FIG. 4B, each transmit bit set 1-M again includes d bits of data as identified by blocks 59 transmitted concurrently with the d bits of data transmitted in the base transmit bit set 0. In the embodiment illustrated in FIG. 4B the data bits transmitted in transmit bit set 0 are part of message 1, and the data bits transmitted in transmit bit sets 1-M are all part of message 2. Thus, the embodiment of FIG. 4B is able to transmit one message with d data bits and one message with (d*M) data bits. Again, this is a significant increase over prior systems that would have been limited to the d bits in the first message.

In the third embodiment illustrated in FIG. 4C, each transmit bit set 1-M includes (d+p+f) bits of message data as identified by blocks 61 transmitted concurrently with the p, f and d bits of data transmitted in the base transmit bit set 0. In the embodiment illustrated in FIG. 4C the data bits transmitted in transmit bit set 0 and the data bits transmitted in transmit bit sets 1-M are all part of message 1. Thus, the embodiment of FIG. 4C is able to transmit one message with $[(M*(d+p+f))+d]$ data bits. Because d+p+f data bits can be transmitted in each of the transmit bit sets 1 through M, the embodiment illustrated in FIG. 4C can transmit an even larger message than those illustrated in FIGS. 4A and 4B. However, this embodiment additional buffering is typically required in the receiver as the receiver is synchronized to the P bits of the preamble and the transmit bits 1 though M arrive before this synchronization is achieved.

In the fourth embodiment illustrated in FIG. 4D, each transmit bit set 1-M again includes (d+p+f) bits of message data as identified by blocks 61 transmitted concurrently with the p, f and d bits of data transmitted in the base transmit bit set 0. In the embodiment illustrated in FIG. 4D the data bits transmitted in transmit bit set 0 are part of message 1 and the data bits transmitted in transmit bit sets 1-M are all part of message 2. Thus, the embodiment of FIG. 4D is able to transmit one message with d data bits and second message with $[(M*(d+p+f))]$ data bits. Because d+p+f data bits can be transmitted in each of the orthogonal codes 1-M, the embodiment illustrated in FIG. 4D can transmit one large message is codes 1-M and one standard length message in code 0.

Again, in each of the embodiments illustrated in FIGS. 4A, 4B, 4C and 4D, the plurality of transmit bit sets 0-M are incorporated into a plurality of transmit codes that are generated using at least one additional spreading code that is orthogonal to the base spreading code. The plurality of transmit codes are then combined into one composite message and the composite message is spread again using another scrambling sequence. The final composite spread message is transmitted to the receiver in the appropriate message time slot.

In some applications it is desirable to support two different types of receivers. For example in a tracking system, the locations of the items being tracked is received by all receivers, but a longer message attached may be private and desirably seen by a subset of the receivers. Further, a receiver that needs only to receive the location data, Message 1, is simpler because only one spreading code is used. The embodiments illustrated in FIG. 4A, 4B and 4D support this capability. In the embodiment illustrated in FIG. 4C, all receivers process a single message.

Figure 5:
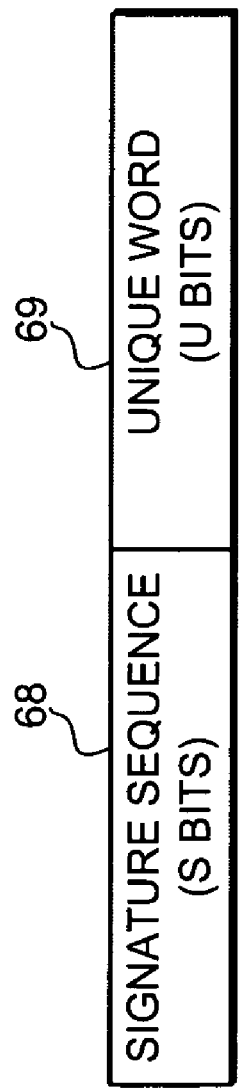
FIG. 5 is a pictorial diagram illustrating a more detailed format of the preamble bits within the TDMA burst of FIG. 4.

Referring to FIG. 5, a more detailed format of the preamble bits of block 54 of FIG. 4 is shown. In particular, FIG. 5 illustrates preamble block 54 as including a signature sequence block 68 of length s and a unique word block 69 of length u bits whereby s+u=p bits. In a preferred embodiment, p=32 as mentioned and s and u=16.

The signature sequence block 68 includes s bits that are different for each spreading code as a sequence are orthogonal, thereby providing good cross correlation properties between the different CDMA channels.

Unique word block 69 includes u bits whereby each of the transmitters share the same unique word thereby providing good auto correlation properties for each CDMA channel and for improving bit synchronization in the receiver.

Figure 6A:
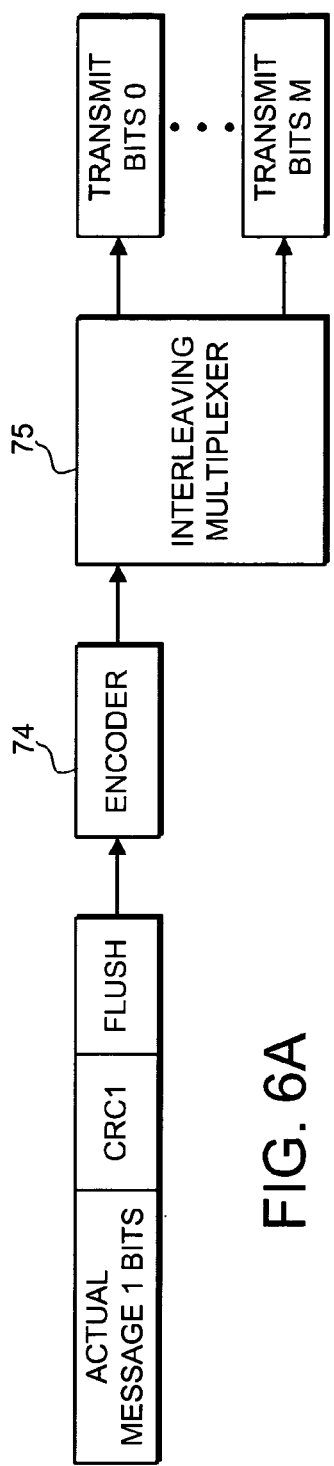
FIG. 6A and 6B are pictorial diagram illustrating the generation of the message bits within the TDMA burst of FIG. 4.
Figure 6B:
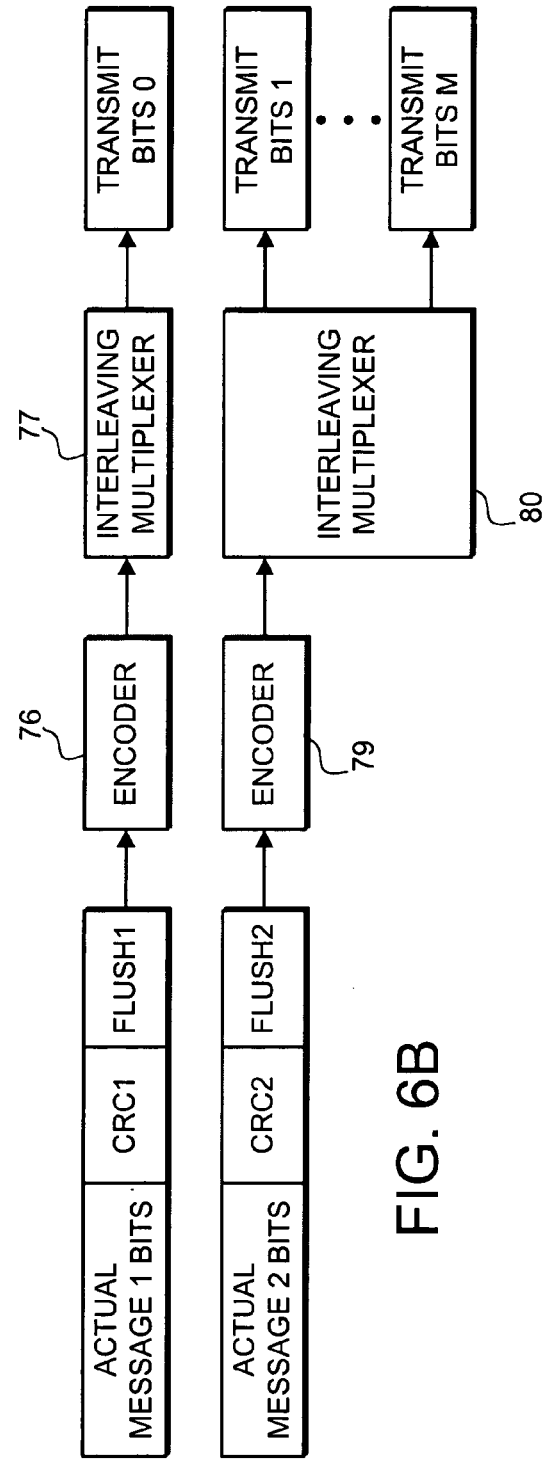

As stated above, the message data is encoded and interleaved into a plurality of transmit bit sets and then is spread across multiple transmit codes. The message data can be encoded and interleaved into a plurality of transmit bit sets using a variety of different techniques. In some embodiments the base message is used to carry a separate message, and in other embodiments the base message is combined with the other channels to carry one message. Turning now to FIGS. 6A and 6B, two embodiments for the generation of bit sets are illustrated. These embodiments are used to generate the bit sets that are spread across multiple transmit codes. In FIG. 6A, an exemplary embodiment where all the transmit bits are part of one message is illustrated. In FIG. 6B, an exemplary embodiment where one transmit bit set is used for a regular length message 1 and the remaining transmit bit sets are used for an extended length message 2.

Specifically, FIG. 6A, is a pictorial diagram illustrating the generation of bit sets for one message as shown in blocks 58 and 59 of FIG. 4A and blocks 58 and 62 of FIG. 4C. FIG. 6A illustrates that actual message 1 bits are transmitted along with cyclic redundancy check (CRC) bits and flush bits. In one exemplary embodiment where M=7, the message data bits can comprise 1306 bits, the CRC bits can comprise 16 bits, and the flush bits can comprise 6 bits for a total of 1328 actual data bits.

These bits are sent through the encoder 74 for performing forward error correction coding on the 1328 bits thereby providing for error correcting capability. One skilled in the art would appreciate that a number of encoders may be used including convolutional encoders, BCH encoders, Turbo Product Codes, Parallel Concatenated Turbo Codes, Serial Concatentated Turbo Code and Reed Solomon encoders. In one example, convolutional encoder is used with a rate of ½, and thus, 1328 actual data bits supplied to the encoder resulted in 2656 bits to be transmitted while having the capability of error correcting. The rate of the convolutional encoder 74 may be chosen based upon certain conditions such as expected number of errors, coding gain, and data transmission speed. These encoded bits are sent through interleaving multiplexer 75 which interleaves the order of the bits prior to transmission to improve the performance of the error correcting capability in the presence of burst errors. The interleaving multiplexer 75 interleaves the encoded message data into M+1 transmit bit sets that will be transmitted in transmit codes 0-M. For example if the embodiment illustrated in FIG.

4A is used, with M=7, each of the transmit bit sets include $\frac{1}{8}^{th}$ of the encoded 2656 bits and is 332 bits long. Alternatively, if the embodiment illustrated in FIG. 4C is used, with P=32 and F=0, and M=7, transmit bit set 0 contains 318 bits of the encoded 2656 bits, and transmit bit sets 1 through 7 contain 334 bits of the encoded 2656 bits.

Turning now to FIG. 6B, an embodiment is illustrated where some data bits are for a regular length message 1 and the remaining data bits are for an extended length message 2. Specifically, FIG. 6B, is a pictorial diagram illustrating the generation of transmit bit sets for two messages as shown in blocks 58 and 61 of FIG. 4B and blocks 58 and 63 of FIG. 4D. FIG. 6B illustrates that actual message 1 and message 2 bits are transmitted along with cyclic redundancy check (CRC) bits and flush bits. In one exemplary embodiment the message 1 data bits can comprise 144 bits, the CRC1 bits can comprise 16 bits, and the flush1 bits can comprise 6 bits for a total of 166 actual data bits. Likewise, the message 2 data bits can comprise 1140 bits, the CRC2 bits can comprise 16 bits, and the flush 2 bits can comprise 6 bits for a total of 1162 actual data bits.

In this embodiment, the bits for message 1 are sent through the encoder 76 for performing forward error correction coding on the message bits thereby providing for error correcting capability. Likewise, the bits for message 2 are sent through encoder 79. Again, skilled in the art would appreciate that a number of encoders may be used including convolutional encoders, BCH encoders, Turbo Product Codes, Parallel Concatenated Turbo Codes, Serial Concatenated Turbo Codes and Reed-Solomon encoders, and that the rate of the convolutional encoder may be chosen based upon a variety of conditions.

These encoded bits for message 1 are sent through interleaving multiplexer 77 which interleaves the order of the bits prior to transmission to improve the performance of the error correcting capability in the presence of burst errors. The encoded bits for message 2 are sent through interleaving multiplexer 80 for the same purpose. Additional, interleaving multiplexer 80 also interleaves the encoded message data into M transmit bit sets that will be transmitted in transmit codes 1-M. For example in an embodiment where 1162 bits are sent to the encoder and a rate ½ Turbo Product Code is used for Encoder 79, 2324 encoded bits are routed to interleaving multiplexer 80. With M=7, each transmit bit set would include 332 of these 2324 encoded bits.

It should be noted that in all these embodiments the number of flush bits would typically selected based upon the constraint length of the decoder used in the receiver to insure that a sufficient number of transmitted bits exists to allow for a decision to be made on the last bit of the CRC.

As described above, the present invention provides a communication system and receiver that facilitates increased message size in a communication system that supports a large number of transmitters sharing a common frequency band. The communication system facilitates increased message size by incorporating a plurality of transmit bit sets into each burst of data. The additional transmit bit sets are incorporated into a plurality of transmit codes that are generated using at least one additional spreading code that is orthogonal to the base spreading code. The additional spreading codes facilitate the simultaneous transmission of additional message bits to a receiver and thus provide for increased message size. Specifically, the message data is first encoded and interleaved into multiple transmit bit sets, with each set including a portion of the overall message data. The message data in the multiple transmit bit sets are then code division multiplexed over multiple transmit codes using multiple orthogonal spreading codes. The multiple transmit codes are combined into one composite message and the composite message is spread again using another scrambling sequence. The final composite spread message is transmitted to the receiver in the appropriate message time slot.

Figure 7:
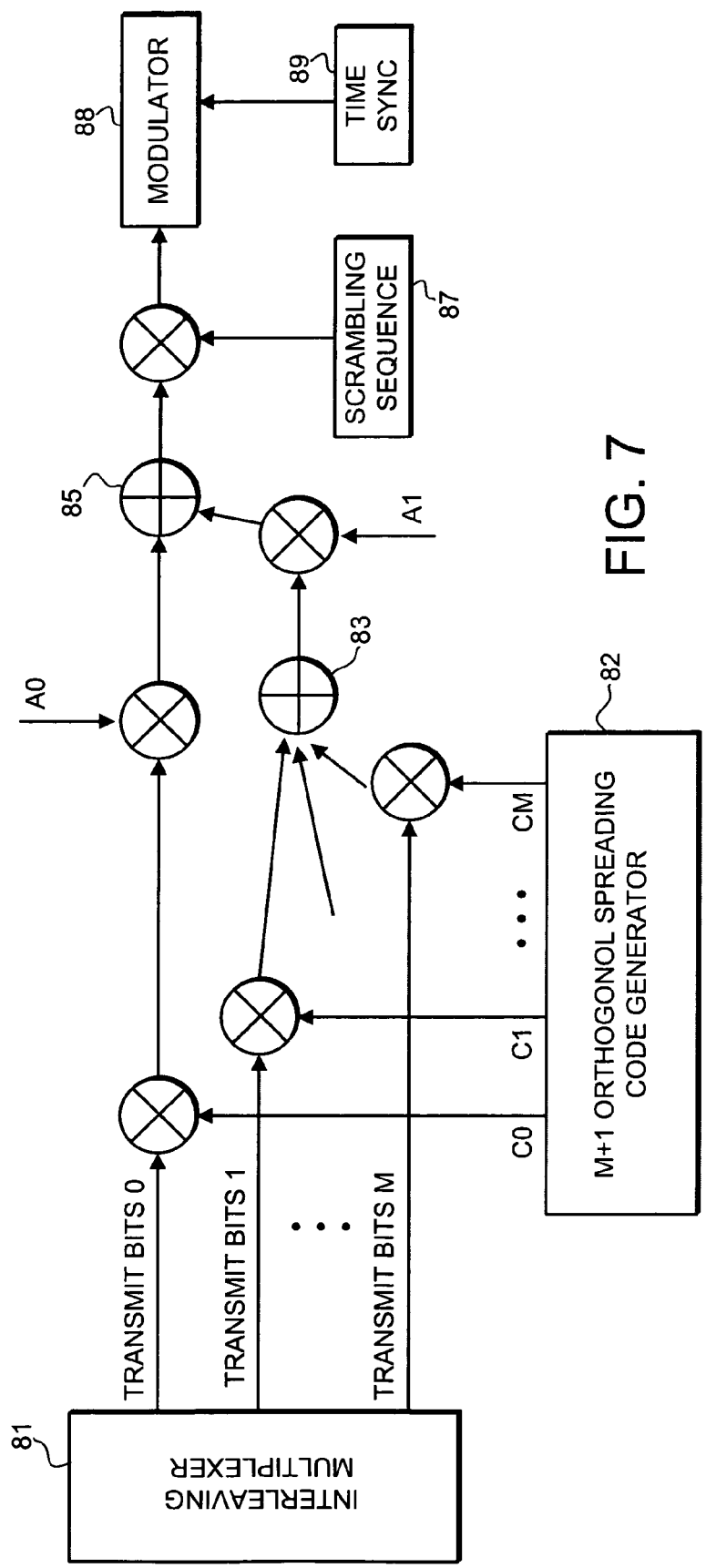
FIG. 7 is a block diagram illustrating the transmission of a multi-code CDM/TDMA burst messages using a CDMA technique.

Referring to FIG. 7, a block diagram illustrating the how multiple transmit bit sets can be spread into multiple transmit codes, combined into one composite message, spread again using a scrambling sequence and transmitted as a TDMA burst is shown. The message data is received from an interleaving multiplexer 81 that formats the messages into the M+1 transmit bit sets. The interleaving multiplexer can comprise one or more interleaving multiplexer such interleaving multiplexers 75, 77 and 80 as illustrated in FIGS. 6A and 6B.

A TDMA burst that includes M+1 transmit bit sets is spread over M+1 transmit codes using M+1 orthogonal spreading codes. The multiple transmit codes are then combined into one composite message and spread again using another scrambling sequence. The TDMA burst can have any suitable structure, including those illustrated in FIG. 4A, 4B, 4C or 4D. The 0-M transmit bit sets are spread to M+1 orthogonal transmit codes using the M+1 Orthogonal Spreading generator 82. A variety of techniques and procedures can be used to spread the message data into M+1 orthogonal transmit codes. For example, a spreading code such as a Walsh code or Hadamard transform can be used to spread the message data to the M+1 orthogonal transmit codes. For example, with a spreading factor of 256, there are 256 orthogonal spreading codes, permitting M up to 255. This provides over 200 times the capacity of the prior art that utilized a single code in the transmitter.

The spread transmit codes 1-M are then combined using the summer 83. The summed transmit codes 1-M are then scaled in amplitude and phase shifted by A1 to set the relative power allocated to transmit bits 1 through M relative to transmit bits 0. Likewise, transmit code 0 is scaled in amplitude by A0. Transmit code 0 and transmit codes 1-M are then combined using the summer 85. For example, in one embodiment where the reception of all bits are equally important, M=7 and A1/A0=2.646 (square root of 7). In another embodiment where two messages are being transmitted by transmit bits 0 and transmit bits 1-M respectively, and where message 1 is more important than message 2, with M=7, A1/A0 would be set to less 2.646, providing more link margin to the receiver for message 1 than message 2. In a preferred embodiment there is a 90 degree phase difference between A1 and A0 that reduces the degradation in the reception of transmit bits 0 due to simultaneous transmission of transmit bits 1-M.

The resulting composite signal is spread again using an additional scrambling sequence 85. Again, a variety of techniques and procedures can be used to spread the composite signal. Typically, it is desirable to use a scrambling sequence that has good cross correlation properties. Examples of such scrambling sequences include Gold Codes and Kasami sequences.

The spread composite signal is then modulated using a modulator 88 that is synchronized using a time sync 89. Several different modulation techniques can be used such as BPSK, QPSK and PSK/OFDM. The time sync 89 assures that the resulting CDM/TDMA burst is transmitted at its specific time in the slot at the carrier frequency while its spectrum is spread over a predetermined frequency range via scrambling sequence 87. In an alternate embodiment, modulator 88 is replicated and moved prior to summer 85, after scaling by A1 and A0 to provide for the ability to use different modulation on transmit bits 0 and transmit bits 1-M. Furthermore, in one embodiment a BPSK transmission at a lower data rate may be used on transmit bits 0 versus a 16QAM transmission at the same or higher rate on transmit bits 1 through M to provide for even higher capacity at the expense of lower link margin for message 2.

Furthermore, it should be noted that with the use of a CDMA spectrum spreading technique, more than one of the transmitters may transmit at the same time and at the same frequency. For example, by using 64 256 bit Kasami scrambling sequences, each TDMA time slot can be used simultaneously by up to 64 transmitters, permitting 64 times the number of transmitters over a classical TDMA only system. Moreover, it is understood that two or more different carrier frequencies may be used for transmitting information thereby increasing the capacity and robustness of the communications system. For example, 8 different carriers could be used, permitting simultaneous transmission by 8 transmitters in each slot for 8 times the capacity without FDM. The carriers could be allocated to different classes of users or different message types to provide for more reliable transmission with less self interference to higher priority users and messages. Thus, using these techniques a plurality of transmitters can each transmit a CDM/TDMA burst signal in each time slot in the superframe.

In one embodiment, a scrambling sequence is synchronized to a bit period and, thus, the scrambling code period lasts one bit period and has a defined phase with the beginning of the bit. Further, modulator 88 may take the form of any modulator. For example, modulator 88 may perform differential Bi-Phase-Shift Keying (BPSK) modulation whereby the same scrambling code for the previous transmitted bit sequence is transmitted if the corresponding bit within the TDMA burst was a logic 0, while the inversion of the scrambling code for the previous transmitted bit sequence is transmitted if the corresponding bit within the TDMA burst was a logic 1. However, it is understood that many other modulation techniques may be used such as differential BPSK or Quadrature Phase-Shift Keying (QPSK).

Figure 8:
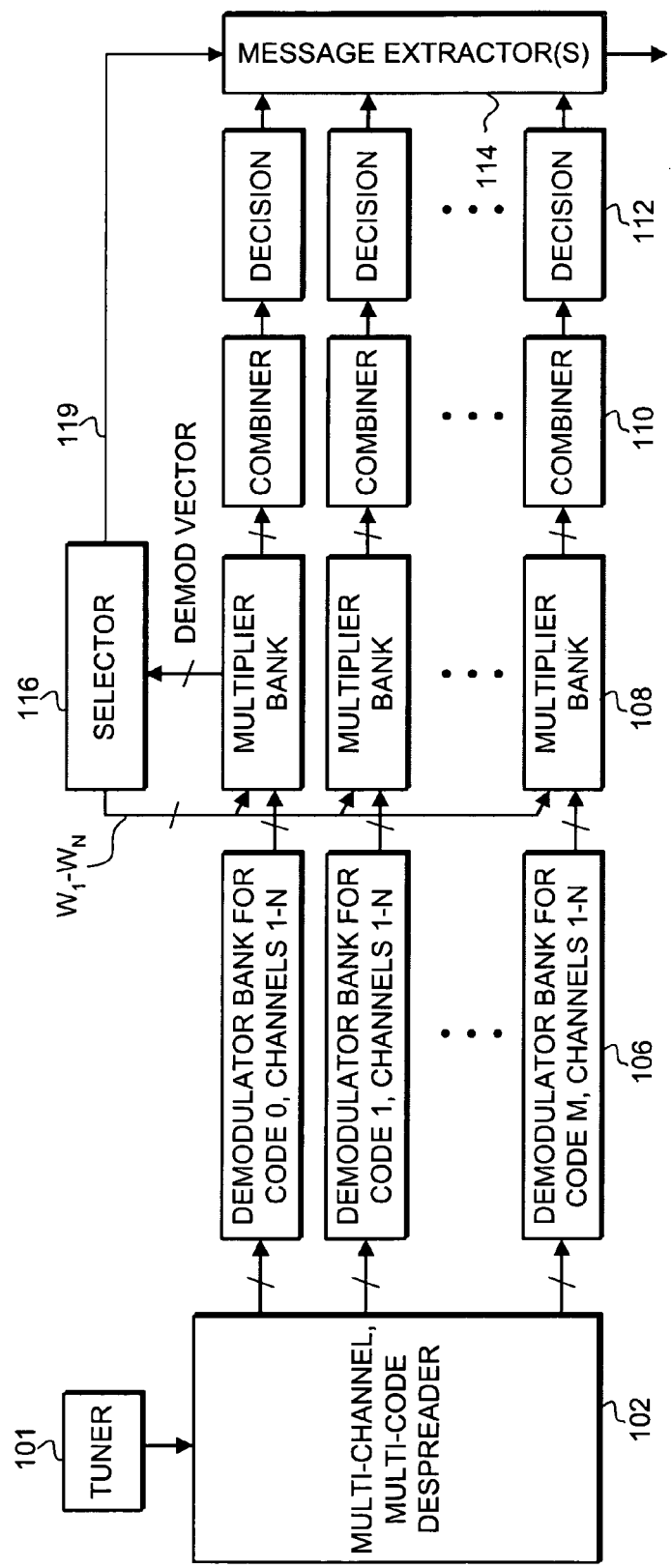
FIG. 8 is a block diagram illustrating a receiver for receiving multi-code CDM/TDMA burst messages in accordance with an exemplary embodiment.

A variety of receivers can be used to receive the CDM/TDMA burst signals. As described above, CDM/TDMA bust signals facilitate increased message size by incorporating at least one additional transmit bit set into each TDMA burst of data. The additional transmit bit sets are incorporated into a plurality of transmit codes that are generated using at least one additional spreading code that is orthogonal to the base spreading code. The plurality of transmit codes are then combined into one composite message and the composite message is spread again using another scrambling sequence. The final composite spread message is transmitted to the receiver in the appropriate message time slot, and thus comprises a CDM/TDMA burst signal. The use of the additional transmit codes facilitate the simultaneous transmission of additional message bits in the CDM/TDMA burst signal thus provide for increased message size. Turning now to FIG. 8, an exemplary receiver 100 is illustrated. The receiver 100 is exemplary of the type of receiver that can be used to receive, despread and demodulate the CDM/TDMA burst messages described above. Such a receiver can despread and demodulate the message data in each of the M transmit codes and output one or more reconstructed messages. This facilitates the inclusion of larger message sizes in a TDMA burst system.

Additionally, the receiver 100 provides the ability to receive, despread and demodulate multiple channels (1-N) for each of the multiple codes (0-M), where each channel in the code is comprises different time delays for signals corresponding to that code. In the communication systems that use spreading sequences, the received signal cannot be guaranteed to be is not perfectly aligned, and each possible variation in alignment is referred to as a possible chip timing of the received signal. For example, if there are 256 chips per bit and the receiver samples at 4 samples per chip, there will be 1024 possible relative time delays between the despreader and the received bit time, and the receiver will receive, despread and demodulate N of these 1024 phases for each of the M codes. The signals from these various time delay channels are demodulated and combined to improve the overall reliability and accuracy of the received signal. Specifically, for each of the codes 0-M the receiver 100 despreads and demodulates all the possible chip timing delay combinations, combines these different timing channels and extracts the message from the combined timing channels.

The receiver 100 includes a tuner 101, a multi-channel, multi-code despreader 102, a demodulator bank 106 for each code 0-N, a multiplier bank 108 for each code 0-N, a combiner 110 for each code 0-N, a decision block 112 for each code 0-N, message extractor(s) 114 and a selector 116. The receiver 100 can rapidly despread and demodulate relatively short, low duty cycle, multi-code, multi-channel TDMA burst signals. To accomplish this, one or more CDM/TDMA burst signals are applied to an input of tuner 101. Tuner 101 converts the received RF signal to a more convenient frequency for further signal processing. For example, the input signal applied at the input of tuner 101 may be at a carrier frequency of 900 MHz and tuner 101 may down convert the signal to a more appropriate frequency for further signal processing such as to a carrier frequency near DC so that digital signal processing techniques can be used. It is noteworthy that tuner 101 may not be necessary if the input signal is already at a carrier frequency that is suitable for further processing.

The output of tuner 101 is applied to an input of a multi-channel multi-code despreader 102. The multi-channel multi-code despreader 102 provides a plurality of despread signals to a plurality of demodulator banks 106. Specifically, the multi-channel multi-code despreader 102 despreads the received signal and outputs M+1 transmit code signals, with each of the M+1 transmit code signals having N channels, for a total of (M+1)*N signals.

In addition to despreading multi-code signals, the multi-channel multi-code despreader 102 includes a plurality of channels, for example, N, for correlating the down converted input signal by a plurality of despreading sequences, respectively, having different phases corresponding to N timing offsets of the spreading code phase. The number of channels is selected based upon phases with potential correlation due to the chip uncertainty between the transmitter and receiver and multipath dispersion. For example, if the transmitter and receiver are synchronized to within 10 chips and the channel is expected to have a dispersion of 0 to 5 chips, then the number of channels would be selected to span a 15 chip code range. With M+1 codes and N channels per code, the resultant correlation levels provide the (M+1)*N plurality of despread signals. One skilled in the art would recognize that there are many methods and circuits which can be used to perform the correlation function. These include the use of a matched filter which can be implemented digitally using digital circuits or software, or the filter can be implemented using analog SAW filters or Acoustic Charge Transport (ACT) devices. Alternatively, classical despreaders using a multiplier to multiply the incoming signal by the spreading sequence followed by a low pass filter, again implemented using analog or digital techniques can be used. Several examples of despreaders that can be adapted for use in receiver 100 can be found at U.S. Pat. No. 5,629,929, by Scott D. Blanchard et al, and entitled "Apparatus for rapid interference cancellation and despreading of a CDMA waveform".

Each of the M+1 transmit code signals is passed to one of the M+1 demodulator banks 106 that correspond to its transmit code. Each demodulator bank 106 includes N demodulators, with each of the N demodulators corresponding to and demodulating one of the N channels. In one embodiment, each demodulator bank 106 performs noncoherent differential phase shift keying (DPSK) demodulation by performing a dot product between correlation level spaced one bit period apart, which essentially means that the demodulators are detecting phase changes from one bit to the next and signal quality. However, it is understood that other demodulators known by those skilled in the art may be used. These include coherent PSK demodulation of the signal which requires carrier recovery, and more complex demodulators which may also include equalization of the bit stream.

The outputs of the M+1 demodulator banks 106 each provide decisions as to whether a logic 1 or a logic 0 bit was transmitted. In a preferred embodiment, demodulator banks 106 each provide "soft" decisions representing the signal quality of its respective despread signal whereby a digital value of −256, for example, represents a strong indication that a logic 0 was transmitted, a digital value of +255 represents a strong indication that a logic 1 was transmitted, and a digital value of +1 or −1 does not provide a good indication at all as to which logical value was transmitted. Other soft decision ranges which reduce the number of bits required to represent the soft decision may also be used.

Figure 9:
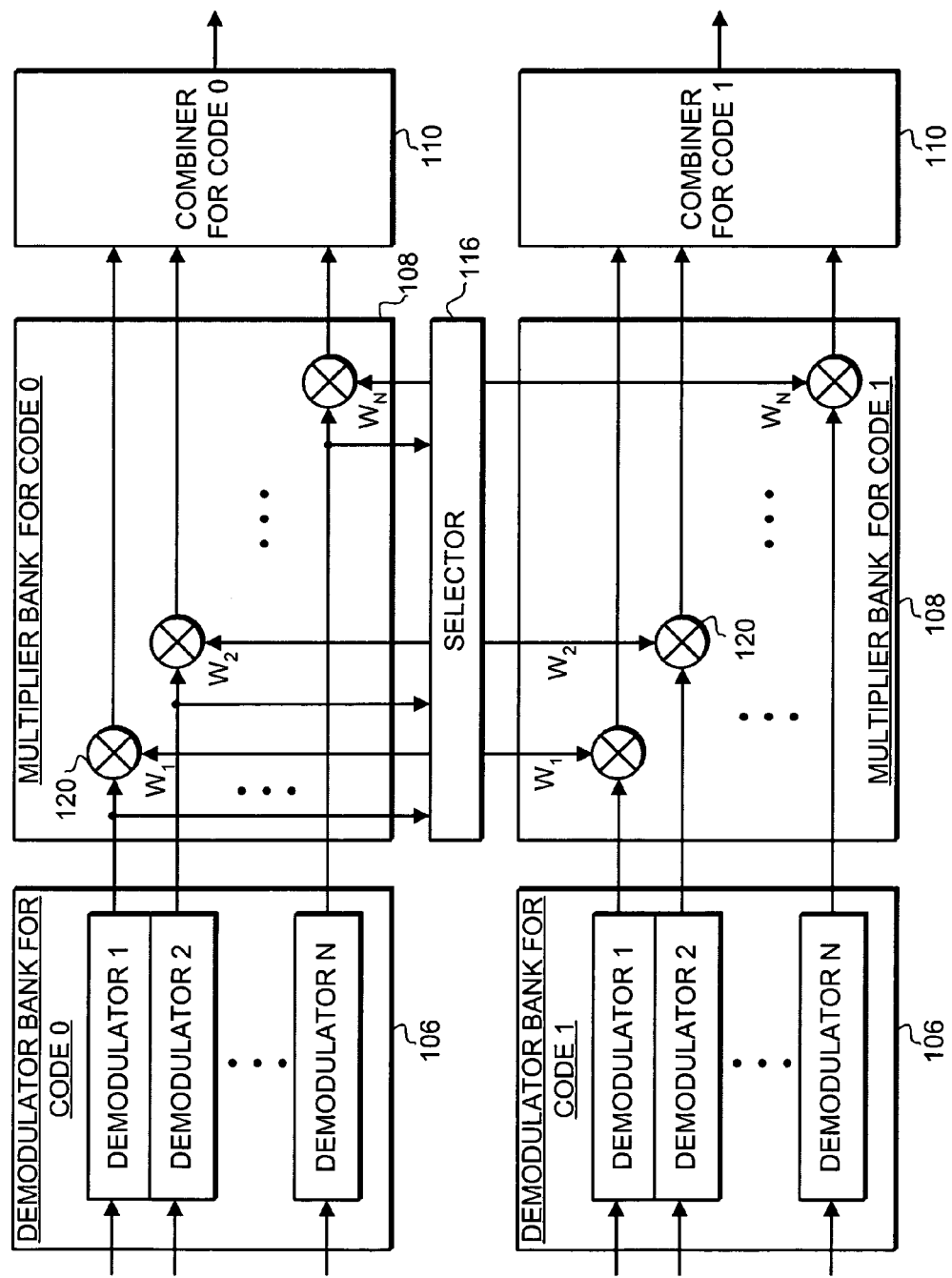
FIG. 9 is a block diagram illustrating a portion of a receiver for receiving multi-code CDM/TDMA burst messages in accordance with an exemplary embodiment.

The outputs of each of the M+1 demodulator banks 106 are applied to a multiplier bank 108. The N demodulator outputs for code 0 are also applied to N inputs of the selector 116. The selector 116 provides a plurality of weighting signals $W_1$-$W_N$ to the multiplier banks 108 and a message indicator signal 119 to the message extractor(s) 114. Turning now to FIG. 9, a demodulator bank 106, multiplier bank 108 and combiner 110 for code 0 and code 1 are illustrated in more detail along with selector 116. The demodulator bank 106, multiplier bank 108 and combiner 110 for code 1 are exemplary of the elements that would also be included for codes 1-N as illustrated in FIG. 8.

As illustrated in FIG. 9, the multiplier bank 108 for code 0 receives N demodulated signals from the demodulator bank 106 for code 0. Likewise, the multiplier bank 108 for code 1 receives the N demodulated signals from the demodulator bank 106 for code 1. The multiplier bank 108 for each code includes a multiplier 120 for each channel 1-N. A similar set of N multipliers 120 would be included in each additional multiplier bank 108. The selector 116 controls the N multipliers 120 in each multiplier bank 108 with N weighting signals $W_1$-$W_N$ that are generated from the N demodulated signals for code 0.

Referring to FIGS. 8 and 9 together, the weighting signals $W_1$-$W_N$ provided by selector 116 to the multipliers 120 in the multiplier bank 108 for each code 0-M are generated in response to the N demodulated signals from code 0, and not from the N demodulated signals from the other codes. Thus, the selector selects and weights the demodulated signals for all transmit codes 0-M based only on the code 0 signals. Operation in this matter provides the performance of M+1 RAKE receivers, weighting the N-channels to maximize the received signal to noise ratio, at less complexity as only one tap weight calculator is needed for each of the M+1 codes are subjected to the same linear distortion and thus have the same optimal weight settings.

The selector 116 processes each of the N output signals from N demodulators for code 0 and provides a plurality of N weighting signals $W_1$-$W_N$ to the second input of each multiplier 120 in each multiplier bank 108. The weighting signals $W_1$-$W_N$, are selected to optimally combine the N channels to maximize signal to noise ratio assisted by the fact that the P bits of preamble are known. Several techniques can be used to implement the weight calculation such as a maximum likelihood estimation based upon the P bits of preamble, Least Mean Squared adaptation (LMS), or recursive least square (RLS) estimation. The N weighting signals $W_1$-$W_N$ applied to the multipliers 120 functionally providing the capability of M RAKE receivers, but at reduced complexity. Thus, the weight of each signal is calculated based upon the estimated signal quality at the output of the N demodulators corresponding to the multipliers that are coupled to the signal weight being calculated. A weight of zero corresponds to poor signal quality, while a high weight, such as a weight of 1, corresponds to excellent signal quality.

In the preferred embodiment, the number of multipliers 120 in each multiplier bank 108 with a non-zero weighted value is limited to a predetermined maximum number which is greater than zero. The number of multipliers is preferably selected based upon the number of expected received code phases which can be estimated from the expected transmitter and receiver filtering and RF multi-path characteristics of the channel. When the maximum number of weights with value other than zero is greater than the number of multipliers, only the largest weights are used, and the remainder are set to zero. For example, if two multipliers are used, and there are three weights with non-zero values of 0.2, 0.6 and 0.8 based upon signal quality, only two non-zero weights would be supplied to the multipliers in the bank weight and combiners, with weights of 0.6 and 0.8. In this manner, the best signals from the demodulator bank corresponding to codes 0-M are supplied to the multiplier banks 108 via their weighted (i.e., scaled) values as implemented by the multiplier banks 108 whereby good quality demodulated signals are weighted more heavily than poor quality demodulated signals to provide improved signal to noise ration compared to equal weighting.

In a preferred embodiment, which uses a noncoherent BPSK demodulator, the number of possible values for the weights used in the multiplier banks 108 is reduced. In this embodiment if the signal quality estimate from each of demodulators in the bank of demodulators 106 for code 0 exceeds a predetermined threshold thereby indicating a good signal quality of the output signal of that demodulator, then selector 116 provides a weighting signal value of 1 to the respective multiplier banks 108 corresponding to that demodulator signal. Otherwise, a weighting signal value of 0 is supplied to the corresponding multiplier, banks 108 thereby indicating a poor signal quality for that demodulator. In this manner, selector 116 determines which outputs of demodulators in the bank of demodulators for code 0 represents the best energy signal and enables these signals to be passed to and provided to combiner 110 by providing a logic 1 to the respective multiplier banks 108.

In this embodiment, multiplier banks 108 can be implemented using switches. If a logic 1 is applied, the switch passes the respective signal from demodulator, if a logic zero is applied, the switch outputs a 0 value signal. However, as discussed above, selector 116 may provide weighting signal values other than 0 or 1 based upon some other modulation scheme or criteria. Additionally, it is understood that selector 116 may provide more than one of the outputs of demodulators 106 to the combiners 110 via selector 116 providing a logic 1 to the second input of more than one multiplier. In a preferred embodiment, selector 116 may provide up to the number of non-zero weighting signal values 1's to the multipliers thereby allowing for the best energy signals to be summed by bank weight and combiner 108.

In a preferred embodiment which uses a noncoherent BPSK demodulator, and limits the weights to a weighting signal value of zero or one, the implementation can further be simplified if the number of non zero weighting signal values is set to one. In this embodiment, multipliers in the multiplier banks 108 can be replaced with a single switch which switches the respective demodulator output from each of the demodulators with an associated weighting signal value of 1 to the bank weight and combiner 110.

In addition to providing the weighting signals $W_1$-$W_N$, the selector 116 provides a message indicator signal 119 to message extractor(s) 114 for indicating that the correlation level with the P preamble bits appearing at the output of at least one of the demodulators exceeds a predetermined threshold thereby indicating that a message is present.

Each combiner 110 receives the N scaled demodulator outputs from its corresponding multiplier bank 108 and sums the scaled signals. The summed scaled signals are each then provided to a corresponding decision block 112. Each decision block 112 compares its summed/combined signal to a set of thresholds to make a "hard" decision of the received bit value and provides this decision to message extractor(s) 114.

In a preferred embodiment, decision blocks 112 provide "soft decision" bits which provide a signal quality level to extractors 114. One skilled in the art will recognize that message extractors 114 may use these "soft decisions" to improve the performance of FEC used in the message. With a BPSK signal, the hard bit decision is determined by comparing the combined signal value with zero. A value greater than zero indicates a bit value of 1, a value less than zero indicates a value of 0. Alternately, simply the sign of the decision may be utilized whereby a positive sign bit denotes a bit value of 1 while a negative sign bit denotes a bit value of 0. One skilled in the art, would recognize that other multi-dimensional comparators may be used for QPSK, 8PSK and QAM modulation schemes, and that for these higher order modulation schemes, each decision would generate multiple bit values.

All signals can be either real or complex signals. For example, if a QPSK demodulator is used, then the outputs of demodulators would be complex. To properly combine multiple demodulator outputs, weighted signals would also be complex and multipliers would be full complex multipliers, multiplying two complex signal inputs and generating a complex output. For a preferred embodiment using a noncoherent BPSK demodulator, the outputs of demodulators and weighted signals would be real. In this embodiment, multipliers would be real multipliers, multiplying two real valued signals to generate a real valued output.

Message extractor(s) 114 performs the necessary functions to recover a message such as de-interleaving, decoding, and a cyclic redundancy check (CRC) required to extract the information contained in the message. As described with reference to FIGS. 4 and 6, each transmitted CDM/TDMA burst can include one or more messages. In the examples illustrated in FIGS. 4A, 4C and 6A, each CDM/TDMA burst included one large message. In this example, a single message extractor 114 would be used to recover the single message for the data encoded in codes 0-M. In the examples illustrated in FIGS. 4B, 4D and 6B, each CDM/TDMA burst included multiple messages. In that example, multiple message extractors 114 would be used to recover the multiple messages from the data encoded in codes 0-M. In either case the message extractor 114 is used to combine data in the codes 0-M into one or more messages that are then formatted for delivery, performing the reverse process described for interleaving multiplexers 75, 77 and 80. Furthermore, in one preferred embodiment, the message includes the location and status of the transmitter. In an alternate embodiment, the message includes compressed speech information.

Thus, the receiver 100 provides the ability to receive the CDM/TDMA burst signals that facilitate increased message size by incorporating at least one additional transmit code that is generated using a plurality of additional spreading codes that are orthogonal to the base spreading code. The additional spreading codes facilitate the simultaneous transmission of additional message bits to a receiver and thus provide for increased message size.

The present invention thus provides a communication system and receiver that facilitates increased message size in a communication system that supports a large number of transmitters sharing a common frequency band. The communication system facilitates increased message size by incorporating a plurality of transmit bit sets in each burst of data. The additional transmit bit sets are incorporated into a plurality of transmit codes that are generated using at least one additional spreading code that is orthogonal to the base spreading code. The plurality of transmit codes are then combined into one composite message and the composite message is spread again using another scrambling sequence. The final composite spread message is transmitted to the receiver in the appropriate message time slot, resulting in CDM/TDMA burst signal that facilitates increased message size.

The present invention thus provides a communication system and receiver that facilitates increased message size in a communication system that supports a large number of transmitters sharing a common frequency band. The communication system facilitates increased message size by incorporating at least one additional transmit code that is generated using a plurality of additional spreading codes that are orthogonal to the base spreading code. The communication system is implemented using frequency division multiple access (FDMA), code division multiple access (CDMA), and time division multiple access (TDMA) techniques for transmitting code division multiplexed (CDM) bursts of data while efficiently using the frequency spectrum and supporting a large number of transmitters/users. Specifically, many users of the communications system share a common frequency band, but each transmit their respective message bursts of data at different and specific times via a TDMA technique, as defined by the system. For each transmission of the message burst, multiple orthogonal codes are used to increase the size of the transmitted message. To facilitate synchronization of the TDMA technique, each transmitter of the system is synchronized to a common timing reference thereby abating the need to maintain synchronization between the transmitters and receivers of the system.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

The invention claimed is:

1. A communications system utilizing code division multiple access (CDMA), time division multiple access (TDMA) and code division multiplexing (CDM) techniques for efficiently transmitting bursts of data from a plurality of users at different data rates to one or more receivers within the system, comprising:
   a timing reference for generating a precise timing signal and a corresponding precise time reference;
   a plurality of transmitters, coupled to the timing reference for providing synchronization between the plurality of transmitters, for transmitting the bursts of data at precise times and time intervals and at a predetermined frequency within a TDMA superframe wherein synchronization between said plurality of transmitters and the one or more receivers is not needed; and
   wherein, each of the transmitted bursts of data includes message data interleaved using an interleaving multiplexer into a plurality of transmit bit sets to increase message size in each of the bursts of data, where the plurality of transmit bit sets are incorporated into a plurality of transmit codes that are generated using at least one additional spreading code that is orthogonal to a base spreading code, combined and spread using a scrambling sequence and modulated with a carrier thereby facilitating simultaneous transmission of the plurality of transmit bit sets for each burst of data within a corresponding time slot within the TDMA superframe, and wherein the TDMA superframe includes a plurality of TDMA frames, each TDMA frame including a plurality of time slots for transmitting the bursts of data.

2. The communication system of claim 1 wherein the plurality of orthogonal spreading codes comprise Walsh codes.

3. The communication system of claim 1 wherein the scrambling sequence comprises a Gold code.

4. The communication system of claim 1 wherein the scrambling sequence comprises a Kasami sequence.

5. The communication system of claim 1 wherein each burst of data includes forward error correction data bits.

6. The communication system of claim 1 wherein each of the bursts of data comprise a first message spread across a first transmit code in the plurality of transmit codes and a second message in other of the plurality of transmit codes.

7. The communication system of claim 1 wherein each of the bursts of data comprise a first message spread across the plurality of transmit codes.

8. The communication system of claim 1 wherein the plurality of transmit bit sets includes a first transmit bit set and other transmit bit sets, the first transmit bit set including:
   a predetermined number of header bits for allowing transmitter settling and for reducing spectral splatter;
   a predetermined number of preamble bits for improving a probability of reception of message bits;
   a first predetermined number of the message bits;
   a predetermined number of tail bits for allowing transmitter turn-off; and
   wherein the other transmit bit sets includes a second predetermined number of message bits.

9. The communication system of claim 8 wherein the second predetermined number of message bits is equal to the first predetermined number of message bits.

10. The communication system of claim 8 wherein the second predetermined number of message bits is equal to at least the first predetermined number of message bits plus the predetermined number of preamble bits.

11. The communication system of claim 8 wherein the second predetermined number of message bits is equal to the first predetermined number of message bits plus the predetermined number of preamble bits plus a predetermined number of fill bits.

12. The communication system of claim 8 wherein the first predetermined number of message bits comprises a first message and wherein the second predetermined number of message bits comprises a second message.

13. The communication system of claim 8 wherein the first predetermined number of message bits and the second predetermined number of message bits comprises a first message.

14. The communication system of claim 8 wherein the preamble bits include:
   signature sequence bits for providing good cross correlation properties between different CDMA channels; and
   unique word bits for providing good auto correlation properties for each CDMA channel and improving bit synchronization.

15. The communication system of claim 1 whereby each one of the plurality of transmitters is assigned (i) at least one time slot within the plurality of TDMA frames for specifying a transmit opportunity, (ii) a position for specifying a first frame within the TDMA superframe for further specifying a transmit opportunity, and (iii) an interval for specifying a number of frames between transmission of bursts of data for further specifying a transmit opportunity.

16. A method for transmitting bursts of data in a communications system having a plurality of transmitters and a plurality of receivers, the method comprising the steps of:
   synchronizing the plurality of transmitters to a common timing reference thereby abating the need to provide synchronization between the plurality of transmitters and the plurality of receivers;
   defining a time division multiple access (TDMA) superframe that includes a plurality of TDMA frames whereby each TDMA frame includes a plurality of time slots for transmission by the plurality of transmitters;
   assigning each of the plurality of transmitters a time slot within the plurality of TDMA frames for transmission;
   transmitting a burst of data from a transmitter in the plurality of transmitters to at least one of the plurality of receivers with a time slot assigned to the transmitter, wherein the step of transmitting from the transmitter comprises:
   interleaving message data into a plurality of transmit bit sets to increase message size in the burst of data;
   spreading the plurality of transmit bit sets into a plurality of transmit codes that are generated using at least one additional spreading code that is orthogonal to a base spreading code;
   combining the spread plurality of transmit bit sets and spreading the combined spread transmit bit sets using a scrambling sequence; and
   simultaneously transmitting the combined and spread plurality of transmit bit sets in the burst of data.

17. The method of claim 16 wherein the plurality of orthogonal spreading codes comprise Walsh codes.

18. The method of claim 16 wherein the scrambling sequence comprises a Gold code.

19. The method of claim 16 wherein the scrambling sequence comprises a Kasami sequence.

20. The method of claim 16 wherein the burst of data includes forward error correction data bits.

21. The method of claim 16 wherein the burst of data spread comprises a first message spread across a first transmit code in the plurality of transmit codes and a second message in other of the plurality of transmit codes.

22. The method of claim 16 wherein the burst of data comprises a first message spread across the plurality of transmit codes.

23. The method of claim 16 wherein the plurality of transmit bit sets includes a first transmit bit set and other transmit bit sets, the first transmit bit set including:
a predetermined number of header bits for allowing transmitter settling and for reducing spectral splatter;
a predetermined number of preamble bits for improving a probability of reception of message bits; and
a first predetermined number of the message bits; and a predetermined number of tail bits for allowing transmitter turn-off; and
wherein the other transmit bit sets include a second predetermined number of message bits.

24. The method of claim 23 wherein the second predetermined number of message bits is equal to the first predetermined number of message bits.

25. The method of claim 23 wherein the second predetermined number of message bits is equal to at least the first predetermined number of message bits plus the predetermined number of preamble bits.

26. The method of claim 23 wherein the second predetermined number of message bits is equal to the first predetermined number of message bits plus the predetermined number of preamble bits plus a predetermined number of fill bits.

27. The method of claim 23 wherein the first predetermined number of message bits comprises a first message and wherein the second predetermined number of message bits comprises a second message.

28. The method of claim 23 wherein the first predetermined number of message bits and the second predetermined number of message bits comprises a first message.

29. The method of claim 23 wherein the preamble bits include:
signature sequence bits for providing good cross correlation properties between different CDMA channels; and
unique word bits for providing good auto correlation properties for each CDMA channel and improving bit synchronization.

30. The method of claim 16 wherein the step of assigning each of the plurality of transmitters a time slot within the plurality of TDMA frames comprises assigning a position for specifying a first frame within the TDMA supetharne for transmission, and assigning an interval for specifying a number of frames between successive transmissions of the bursts of data.

31. A transmitter utilizing time division multiple access (TDMA) and code division multiplexing (CDM) techniques for efficiently transmitting bursts of data, the transmitter comprising:
a timing reference for generating a precise timing signal and a corresponding precise time reference;
an interleaving multiplexer, the interleaving multiplexer interleaving message data into a plurality of transmit bit sets to increase message size in a burst of data;
an orthogonal spreader, the orthogonal spreader spreading the plurality of transmit bit sets across a plurality of transmit codes that are generated using at least one additional spreading code that is orthogonal to a base spreading code;
a combiner, the combiner combining the spread plurality of transmit bit sets; and
a scrambling sequence, the scrambling sequence scrambling the combined and spread plurality of transmit bit sets for transmission of the burst of data within a corresponding time slot within a TDMA superframe, thereby facilitating simultaneous transmission of the plurality of transmit bit sets in the burst of data, wherein the TDMA superframe includes a plurality of TDMA frames, each TDMA frame including a plurality of time slots for transmitting the bursts of data.

32. The transmitter of claim 31 wherein the plurality of orthogonal spreading codes comprise Walsh codes.

33. The transmitter of claim 31 wherein the scrambling sequence comprises a Gold code.

34. The transmitter of claim 31 wherein the scrambling sequence comprises a Kasami sequence.

35. The transmitter of claim 31 wherein each burst of data includes forward error correction data bits.

36. The transmitter of claim 31 wherein each of the bursts of data comprise a first message spread across a first transmit code in the plurality of transmit codes and a second message in other of the plurality of transmit codes.

37. The transmitter of claim 31 wherein each of the bursts of data comprise a first message spread across the plurality of transmit codes.

38. The transmitter of claim 31 further comprising a modulator, the modulator modulating the plurality of transmit bit sets for transmission.

39. The transmitter of claim 31 wherein the plurality of transmit bit sets includes a first transmit bit set and other transmit bit sets, the first transmit bit set including:
a predetermined number of header bits for allowing transmitter settling and for reducing spectral splatter;
a predetermined number of preamble bits for improving a probability of reception of message bits; and
a first predetermined number of the message bits; and a predetermined number of tail bits for allowing transmitter turn-off; and
wherein the other transmit bit sets includes a second predetermined number of message bits.

40. The transmitter of claim 39 wherein the second predetermined number of message bits is equal to the first predetermined number of message bits.

41. The transmitter of claim 39 wherein the second predetermined number of Message bits is equal to at least the first predetermined number of message bits plus the predetermined number of preamble bits.

42. The transmitter of claim 39 wherein the second predetermined number of message bits is equal to the first predetermined number of message bits plus the predetermined number of preamble bits plus a predetermined number of fill bits.

43. The transmitter of claim 39 wherein the first predetermined number of message bits comprises a first message and wherein the second predetermined number of message bits comprises a second message.

44. The transmitter of claim 39 wherein the first predetermined number of message bits and the second predetermined number of message bits comprises a first message.

45. The transmitter of claim 39 wherein the preamble bits include:
signature sequence bits for providing good cross correlation properties between different CDMA channels; and
unique word bits for providing good auto correlation properties for each CDMA channel and improving bit synchronization.

46. The transmitter of claim 39 whereby each one of the plurality of transmitters is assigned (i) at least one time slot within the plurality of TDMA frames for specifying a transmit opportunity, (ii) a position for specifying a first frame within the TDMA superframe for further specifying a transmit opportunity, and (iii) an interval for specifying a number of frames between transmission of bursts of data for further specifying a transmit opportunity.

* * * * *

UNITED STATES PATENT AND TRADEMARK OFFICE
CERTIFICATE OF CORRECTION

| | | |
|---|---|---|
| PATENT NO. | : 8,000,377 B2 | Page 1 of 1 |
| APPLICATION NO. | : 10/853481 | |
| DATED | : August 16, 2011 | |
| INVENTOR(S) | : Scott D. Blanchard | |

It is certified that error appears in the above-identified patent and that said Letters Patent is hereby corrected as shown below:

Col. 19, lines 39-45; in the claim section, please make the following correction to claim 30:

30. The method of claim 16 wherein the step of assigning each of the plurality of transmitters a time slot within the plurality of TDMA frames comprises assigning a position for specifying a first frame within the TDMA ~~superthame~~ superframe for transmission, and assigning an interval for specifying a number of frames between successive transmissions of the bursts of data.

Signed and Sealed this
Twenty-fifth Day of October, 2011

David J. Kappos
*Director of the United States Patent and Trademark Office*